United States Patent [19]

Tsuruta et al.

[11] Patent Number: 5,231,860
[45] Date of Patent: Aug. 3, 1993

[54] WORK FEEDER CONTROLLER

[75] Inventors: Katsuji Tsuruta, Hiratsuka; Eiji Yoshikawa, Isehara, both of Japan

[73] Assignee: Kabushiki Kaisha Komatsu Seisakusho, Tokyo, Japan

[21] Appl. No.: 842,133
[22] PCT Filed: Sep. 21, 1990
[86] PCT No.: PCT/JP90/01213
 § 371 Date: Mar. 23, 1992
 § 102(e) Date: Mar. 23, 1992
[87] PCT Pub. No.: WO91/04116
 PCT Pub. Date: Apr. 4, 1991

[30] Foreign Application Priority Data

Sep. 22, 1989 [JP] Japan .................. 1-247419
Sep. 22, 1989 [JP] Japan .................. 1-247420

[51] Int. Cl.⁵ ............................. B21D 43/05
[52] U.S. Cl. ............................. 72/21; 72/405
[58] Field of Search ............. 72/405, 421, 21

[56] References Cited

U.S. PATENT DOCUMENTS 4,120,185 10/1978 Schneider ............... 72/421
4,627,253 12/1986 Tennessen .............. 72/405
4,653,311 3/1987 Tack ....................... 72/405

FOREIGN PATENT DOCUMENTS 1-118327 5/1989 Japan .
1-50490 10/1989 Japan .

OTHER PUBLICATIONS

Eiju Matsunaga, "Transfer Press Forming", *Nikkan Kogyo Shinbunsha*, pp. 165-197, Jun. 30, 1975.
*Microcomputers and Applications*, edited by Association of Electronic Communication Engineering, Corona Corporation, pp. 1-3 and 126-129, Tokyo, Apr. 10, 1981.

*Primary Examiner*—Daniel C. Crane
*Attorney, Agent, or Firm*—Richards, Medlock & Andrews

[57] ABSTRACT

A controller for a feeder which automatically feeds a work into and out of a press machine in relation to the operation of said press machine. The controller is capable of automatically setting optimum motion curve in accordance with the configurations and sizes of the press die and the work and determining whether any undue operating condition has been set. To this end, the feeder controller has a device for setting the operation start angle value and operation finish angle value in terms of the rotation angle of a crank shaft of the press machine, and computing device for determining a motion curve on the basis of the operation start and finish angle values. The feeder controller also has a device for computing allowable maximum operation stroke number of the press machine and a device for comparing this stroke number with a set stroke number for the purpose of determination as to whether motors are overloaded or not.

30 Claims, 6 Drawing Sheets

| PRESS ANGLE | FEED SHAFT STROKE | CLAMP SHAFT STROKE | LIFT SHAFT STROKE |
|---|---|---|---|
| ⋮ | ⋮ | ⋮ | ⋮ |
| 13653 | 0 | 5 | 1495 |
| 13654 | 10 | 2 | 1498 |
| 13655 | 20 | 0 | 1500 |
| ⋮ | ⋮ | ⋮ | ⋮ |

WORK FEEDER CONTROLLER

TECHNICAL FIELD

The present invention relates to a work feeder which is used in automatic press system and which automatically brings a work into and out of the press machine in relation to the operation of the press machine and, more particularly, to a work feeder controller which operates with high degrees of reliability and efficiency.

BACKGROUND ART

Hitherto, automatic feed of a work into and out of an automatic press system was conducted by means of a work feeder (abbreviated as "feeder", hereafter) which operates in accordance with a predetermined motion curve by being triggered by, for example, a signal from a limit switch which operates when a predetermined angle has been reached by the crank of the press machine. The feeder operates so as to feed the work into and out of the press machine so as to follow a predetermined motion curve, by a specific construction of a link mechanism and a suitable control of the operation speed of a motor. The arrival of the feeder at a predetermined position is detected by, for example, a limit switch and a signal output from the limit switch is transmitted to the press machine, thereby causing the press machine to initiate the next cycle of operation.

In another known method, shafts of a feeder are controlled by a specific combination of cams operatively associated with the crank of the press machine or by other mechanical action linked with the crank.

The method which relies upon a limit switch suffers from a disadvantage in that the next cycle of operation has to be commenced before confirming completion of the instant cycle of operation, in view of a time tolerance or variation in the mechanical operation triggered by the signal from the limit switch. On the other hand, the method relying upon mechanical means is disadvantageous in that there is a practical limit in the operation speed. Therefore, in order to realize a higher speed of operation of the press machine system with higher degree of reliability, it is necessary to obtain a closer correlation between the feeder operation and the crank angle of the press machine. Under this circumstance, in recent years, it has become popular to use, for example, a servo mechanism in which the feeder position is electrically controlled with high precision in accordance with the crank angle which is measured by a synchronous measuring device.

A description will now be given of a circuit for effecting the above-described control, with specific reference to FIG. 9. Referring to FIG. 9, numeral 82 designates a synchronous transmitter which is attached to the crank shaft of a press machine and which can measure the absolute value of the angle of rotation of the crank, while 83 denotes a conversion circuit which converts the angle information derived from the synchronous transmitter into digital codes. The digital codes indicative of the crank angle of the press machine are delivered to a computer 81. The computer 81 reads position information for each of a feed shaft, a lift shaft and a clamp shaft of the press machine, the information being beforehand determined in relation to the crank angle and stored in a memory device. The computer 81 then forms a position command signal in accordance with the read information. Numeral 88 collectively designates position detecting synchronous transmitters which are attached to respective operational shafts. In FIG. 9, the construction is shown in regard to only one shaft, because the constructions for the other two shafts are similar. Position information measured by the synchronous transmitter 88 attached to, for example, the feed shaft, is converted into digital code by means of a conversion circuit 89 and is inputted to a controlling computer 81. The feed shaft position information thus inputted to the computer is compared with a previously determined position command signal and the computer 81 forms an offset signal in accordance with the result of the comparison. Subsequently, a speed command signal for a feed shaft drive motor, which is beforehand stored in the memory device and which corresponds to the level of the offset signal, is read and outputted after being coded into a digital code. The speed command signal for the feed shaft drive motor is converted into an analog signal by an analog conversion circuit 84 and is amplified by a servo amplifier 85 to an appropriate level of power by which the servo motor 86 is driven. The servo motor 86 drives the feed shaft. Meanwhile, a tacho-generator 87 mechanically coupled to the servo motor 86 measures the number of rotations of the servo motor shaft, the result being returned to the servo amplifier 85. Thus, a feedback loop is formed to enable a stable control of the rotation of the motor. The synchronous transmitter 88 for detecting the aforementioned feed shaft position information is connected to the feed shaft, so as to input correct data of the instant position of the feed shaft. It is therefore possible to control the feeder in accordance with the crank angle of the press machine such as to meet a predetermined condition.

In this type of system, the operation of the feeder is fixed in relation to the crank angle of the press machine. Namely, only a fixed operation angle can be obtained for a given crank angle, so that the motion pattern is fixed. (It is to be noted, however, that the operation strokes of the respective shafts of the feeder are semi-fixed in the case of a pure mechanical driving system and are variable in the case of an electrical synchronous type system.) The fact that the operation angles are fixed poses a restriction in the design of the press dies and makes it impossible to fully use the performance of the motors. More specifically, in consideration of the risk for interference with the die, the operation angles of the respective shafts are preferably set ahead during upward stroking of the press machine and set back during downward stroking of the press, in order to reduce loads on the respective motors and to facilitate the control, while reducing the production cost. The possibility of free setting of the operation angles and strokes of the respective shafts in accordance with the size and configuration of the die advantageously reduces restriction in the design of the die and enables the performance of the motors to be fully utilized.

On the other hand, the ability to vary the operation angles in accordance with the die specifications causes the specifications of the drive motors of the press machine to be exceeded. For instance, a too small pitch of the operation angle may cause the drive motor to operate at a speed higher that the maximum allowable speed. Similarly, an acceleration torque exceeding the instantaneous maximum allowable torque may be required. This leads to various problems. For instance, if the press machine operates at a press crank rotation speed which is determined in accordance with set operation angle data or set shaft stroke data, the position of the feeder may become out of phase with the press crank angle, due to insufficiency of the performance of the motors of the feeder, with the result that the system is emergency-stopped due to the mismatching of phase between the press machine and the feeder or the motor stops operation due to overload. It takes an impractically long time for the detection of the cause of the stopping of the press system.

In view of the two problems described above, an object of the present invention is to provide a work feeder device which is capable of automatically setting optimum motion curve in accordance with the specifications of the press die, so as to enable full use of performance of the motor for driving each shaft of the feeder while averting from interference with the die, and which can detect any undue operating conditions thereby preventing accidental stopping of the motor operation which may otherwise be caused by such undue operating conditions.

DISCLOSURE OF THE INVENTION

According to a first aspect of the present invention, there is provided a work feeder controller comprising: operation start angle value setting means for setting, in terms of the rotational angle of a crank shaft of the press machine, the timing at which one of the movable shafts of the work feeder starts to operate; operation finish angle value setting means for setting, in terms of the rotational angle of a crank shaft of the press machine, the timing at which the movable shaft of the work feeder finishes the operation; and movable shaft motion curve computing and setting means for setting the motion curve of the movable shaft on the basis of the operation start angle and the operation finish angle. The operation start angle value and the operation finish angle value are set through an operation panel which is connected through an interface circuit to a computer. The motion curve of the movable shaft is formed by a computer having a program for computing the position of the movable shaft in relation to the crank rotation angle, and is stored in a memory device connected to the computer and serving as a table.

According to a second aspect of the present invention, there is provided a work feeder comprising: means for setting and storing motion curves of the respective movable shafts for given work, together with the stroke values (travel distances) of the motion curves; means for setting and storing specification values of the driving motors for driving the respective movable shafts; operation start angle value setting means for setting, in terms of the rotational angle of a crank shaft of the press machine, the timing at which one of the movable shafts of the work feeder starts to operate; operation finish angle value setting means for setting, in terms of the rotational angle of a crank shaft of the press machine, the timing at which the movable shaft of the work feeder finishes the operation; means for computing the allowable maximum operation stroke number of the press machine on the basis of the operation start angle, the operation finish angle, and the stroke values of the respective movable shafts and the driving motor specifications which have been stored; and means for comparing the allowable maximum operation stroke number with the stroke number which has been set, for the purpose of evaluation of said allowable maximum operation stroke number. In a specific form, the feeder controller further has means for setting and storing the specifications of motors in the press machine, and means for setting and storing load conditions which are required by the nature of the work, and the allowable maximum operation strokes of the press machine is determined in consideration of, in addition to the aforementioned factors, the press motor specifications and the load conditions required by the work, and the thus computed allowable maximum operation stroke number is compared with the stroke number which has been set, for the purpose of evaluation.

The first aspect of the present invention enables automatic setting of motion curves for the driving motors of the respective movable shafts, by setting, in accordance with the nature of the work, the angle values at which the work feeder starts and stops to operate, whereby the performance of each shaft driving motor can be fully utilized while avoiding interference with the press die.

According to the second aspect, whether undue operating conditions will be posed on each movable shaft drive motor can be confirmed at the time of setting of data necessary for the press work, so that emergency stopping of the press and the feeder due to undue loading can be avoided.

THE BEST MODE FOR CARRYING OUT THE INVENTION

An embodiment of the work feeder controller of the present invention will be described with reference to FIGS. 1 to 7.

Figure 1:
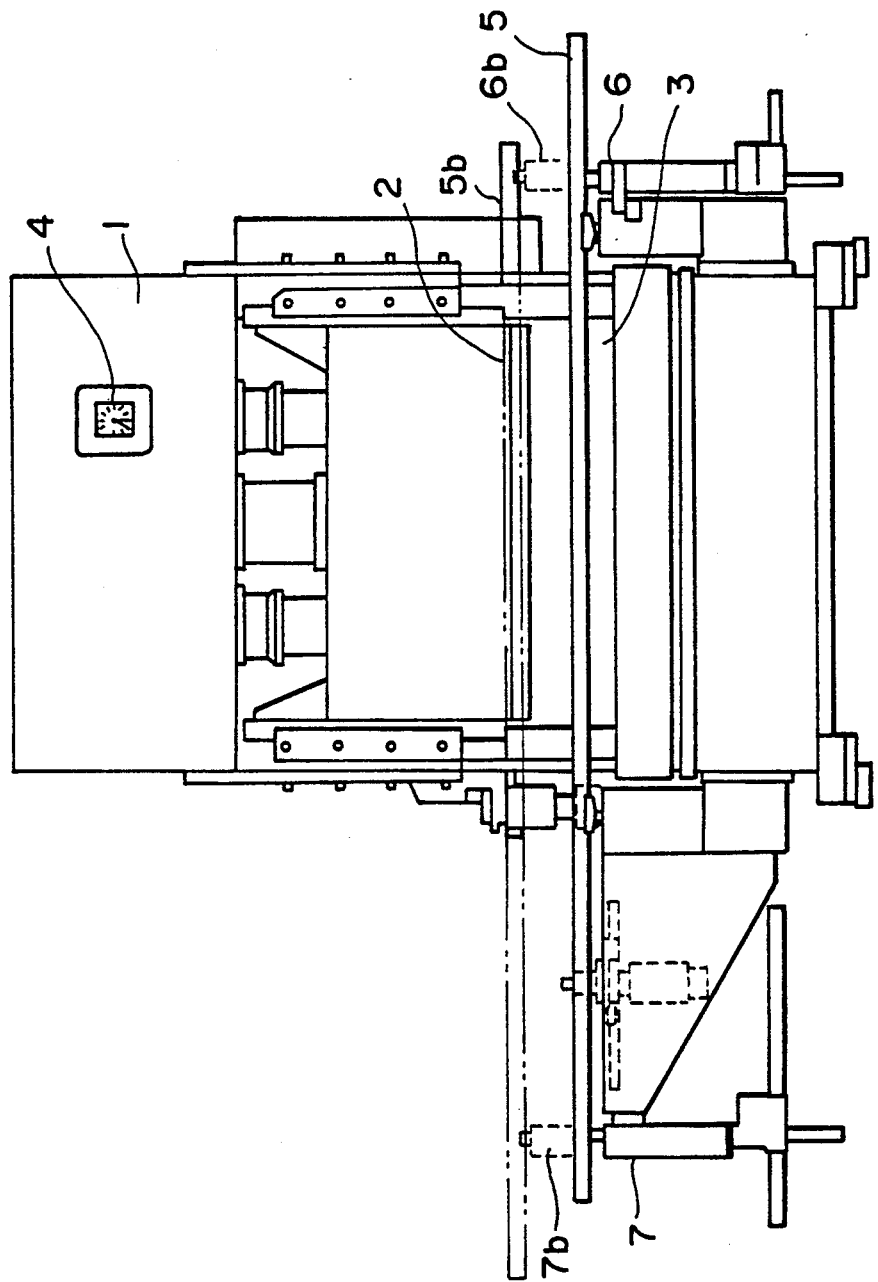
FIG. 1 is a view of the whole system embodying the present invention including a press machine and a work feeder.

Referring to FIG. 1, numeral 1 denotes the body of a press, and 2 denotes an upper die which is suspended from a crank shaft and which cooperates with a lower die 3 disposed on a lower portion of the press body 1 so as to effect a press work on a work which is disposed therebetween. Numeral 4 designates an indicator which indicates the crank angle of the press. This indicator operates in response to a signal from a synchronous transmitter which is attached to the crank shaft so as to generate and deliver a command signal upon sensing the crank angle. Numeral 5 designates a feeder which moves to the left and right as viewed in the drawings so as to feed the work into and out of the press. Numerals 6 and 7 denote cylinders for lifting and lowering the feeder. The cylinders 6, 7 in an extended position for lifting the feeder 5 are designated at 6b and 7b. Numeral 5b indicates the feeder 5 which has been moved to left by a mechanism (not shown) for effecting a lateral movement of the feeder 5.

Figure 2:
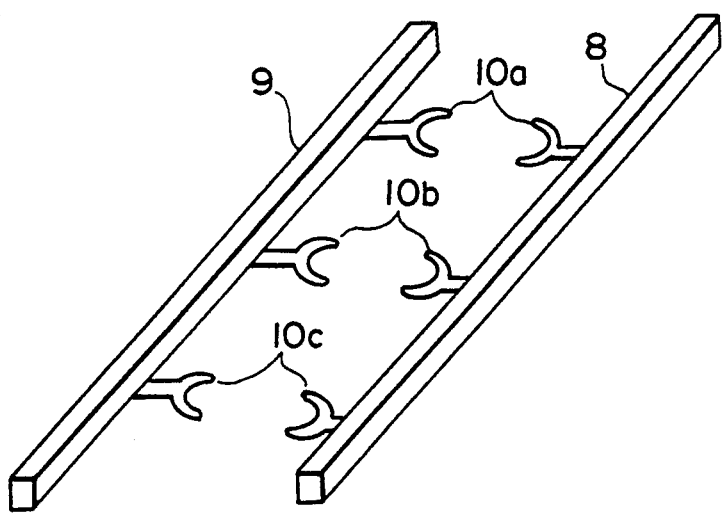
FIG. 2 is an illustration of an embodiment of the work feeder in accordance with the present invention.

Referring now to FIG. 2, numerals 8 and 9 denote a pair of feeders which extend in the forward and backward directions with respect to the press body 1. Three pairs of opposing iron hands 10a, 10b and 10c are provided on these feeders 8, 9. The iron hands of each pair cooperate with each other in clamping a work to be machined so as to move the work into and out of the position where the work is to be press-worked. Driving means for moving the pair of feeders 8, 9 up and down and to the left and right and driving means for causing clamping and unclamping actions of the iron hands are omitted from the drawings.

Figure 3A:
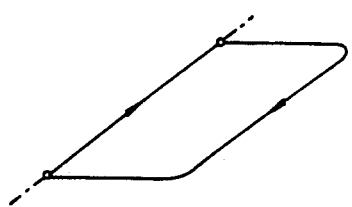
FIGS. 3A-3F are illustrations of various operations performed by the work feeder embodying the present invention.
Figure 3B:
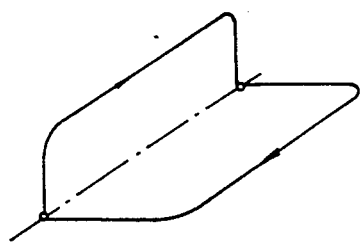
Figure 3C:
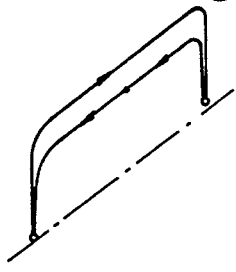
Figure 3D:
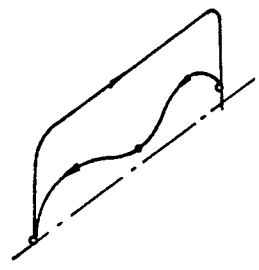
Figure 3E:
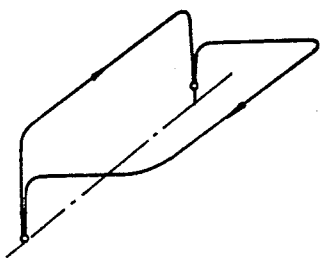
Figure 3F:
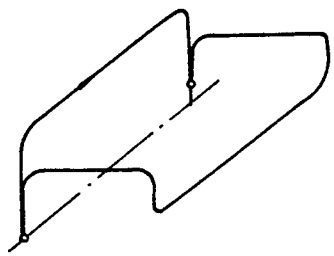

FIGS. 3(A)-3(F) illustrate six examples of the motion of the above-mentioned feeders. Namely, in FIG. 3(A), a clamped work is moved to the right as viewed in the drawings and, after the work has been placed in a position between the upper and lower dies, the feeders unclamp the work and are moved laterally to clear the dies. In FIG. 3(B), in order to prevent interference of the work with the die, the clamped work is moved upwardly as viewed in FIG. 3(B) and then moved to the right to a position above the next die. The work is then lowered and unclamped and, thereafter, the feeders are moved laterally so as to clear the dies and then returned to the initial clamping position. Four examples shown in FIGS. 3(C) to 3(F) are particularly suitable in the case where the work is held by means of vacuum. More specifically, in FIG. 3(C), a work sucked and held by vacuum is lifted and moved to the position above the next die and is then lowered and unclamped. Motions shown in FIGS. 3(D) to 3(F) also include vertical movements. The paths of movement are determined in accordance with the configurations of the press machine, the dies and the work so as to prevent any interference between them, while minimizing the distance of movement. Although in the examples of FIGS. 3(A)-3(F) the work is made to pass through the region between the dies, this is only illustrative and the motion of the feeders may be determined to transfer the work from a supply device to the dies, from the dies to a delivery device, and so forth.

Figure 4:
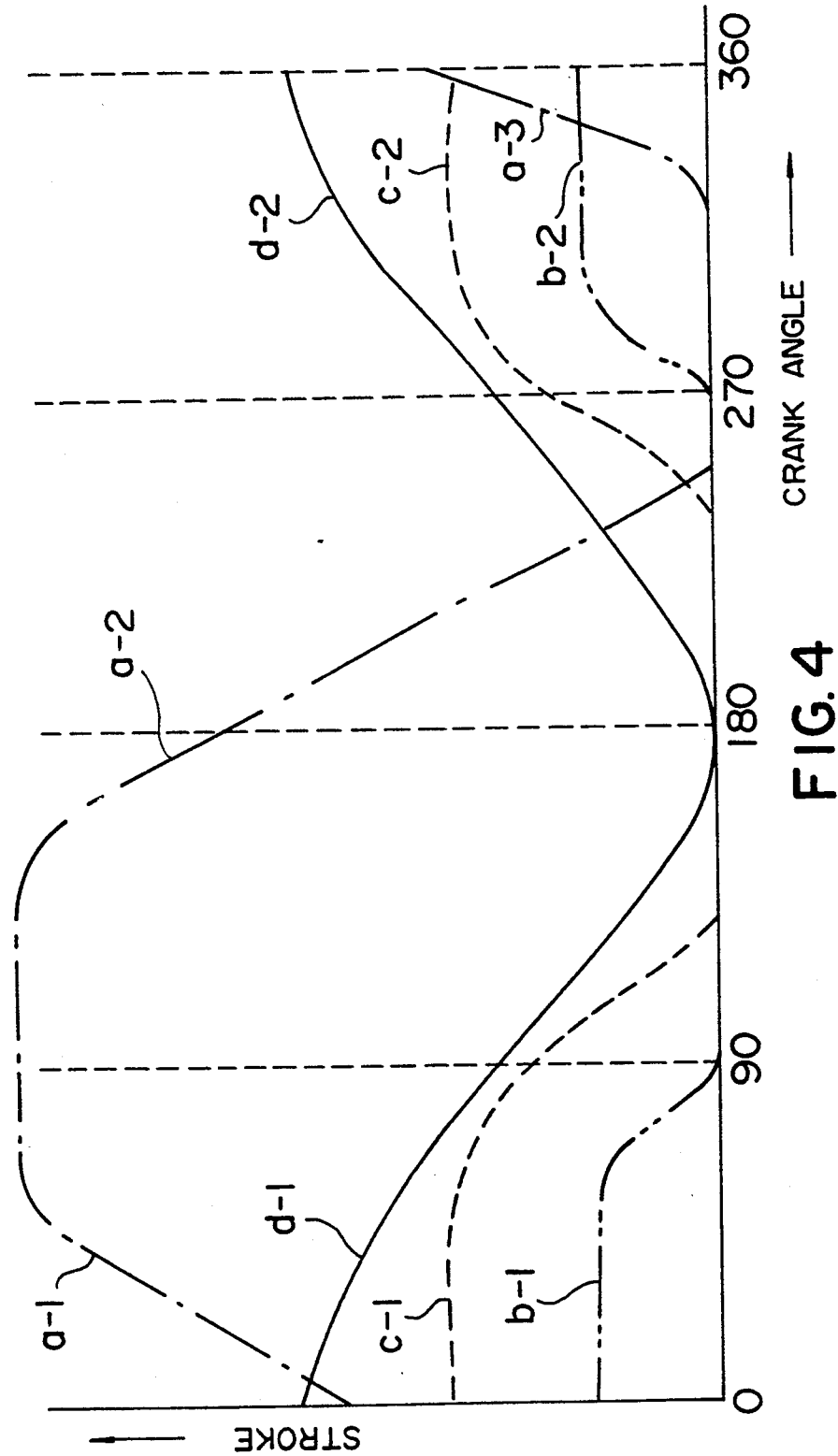
FIG. 4 is an illustration of an interlocked operation of a press machine and a work feeder in a system in accordance with the present invention.

FIG. 4 illustrates the above-described motion of the feeders in relation to the operation of the press machine. A curve d-1 shows the downward sidestroke of the press in relation to the crank angle. The point of the crank angle being 0° is the top dead center, while the point of the angle being 180° is the bottom dead center at which the upper die is positioned at its lower stroke end so as to press the work. A curve a-1 illustrates the motion of the feeder during forward movement of the same, while a curve a-2 illustrates the feeder motion during its backward or returning stroke. A curve b-1 shows downward movement of the feeder. It will be see that the feeder starts to be lowered at a moment somewhat earlier than the moment at which the forwarding feeder reaches a predetermined position (top of the curve a-1). Immediately before the feeder reaches the lower end of its vertical stroke, a mechanical hand which has clamped the work unclamps the work as shown by a curve c-1, thereby setting the work on the die. Simultaneously with the setting of the work on the die, the feeder commences its returning stroke as shown by the curve a-2 and, when the feeder has been returned to a position where it does not interfere with the press, the crank is advanced to the angle of 180°, i.e., to the lower stroke end, thereby pressing the work. After the completion of the press work, the upper die of the press starts to rise (curve d-2). When the upper die has been raised to a level where it does not interfere with the feeder, the feeder commences clamping operation as shown by a curve c-2. The feeder carries a plurality of mechanical hands which are spaced apart from adjacent ones by a distance corresponding to the feed distance. Therefore, the mechanical hand which is adjacent to the mechanical hand which has brought the work to the press position now clamps the work which has been press-worked, and the mechanical hand which has brought the work to the press position is returned to clamp the work which is to be press-worked next. After the works have been clamped, the feeder is raised as indicted by a curve b-2 and, when it has been raised to a level where the works do not interfere with the dies, it starts to move forward as indicated by the curve a-3. When the crank of the press machine has rotated through 360°, i.e., to the angle position of 0°, the press is reset to the initial condition for the next cycle of the press work. All the curves mentioned above are determined appropriately in relation to the crank angle, so that the feeder may not be excessively accelerated even when it operates at high speed while clamping the works.

Figures 5, 6:
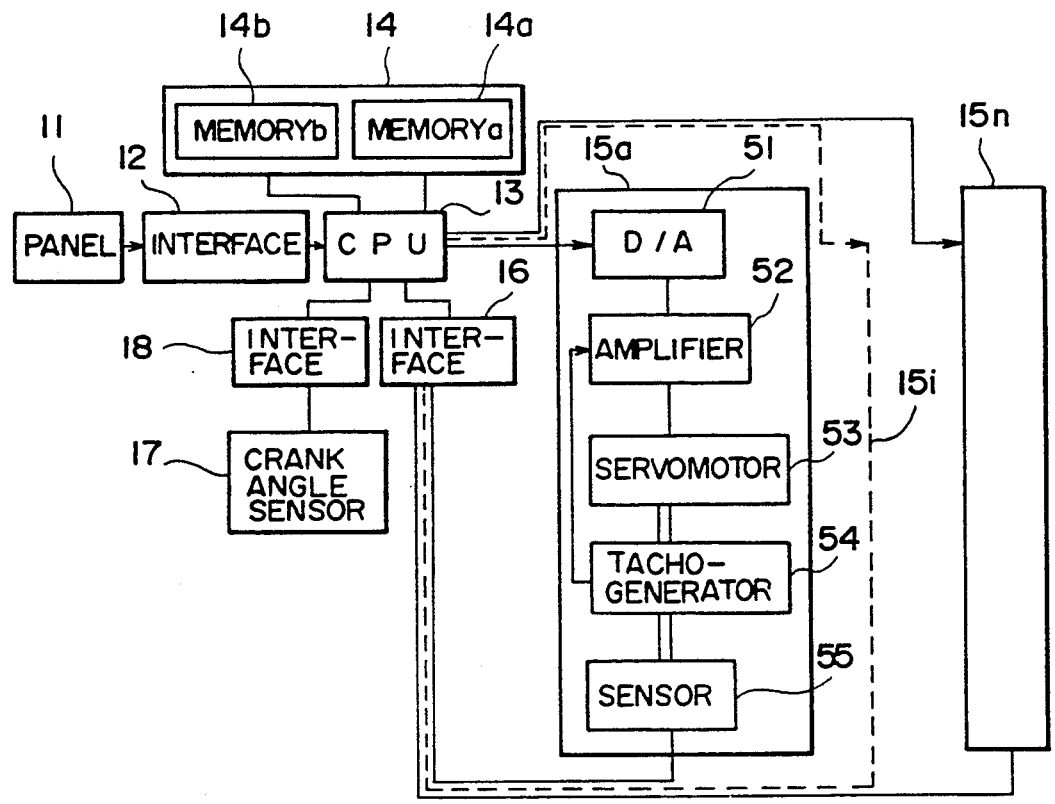
FIG. 5 is a block diagram of a work feeder controller embodying the present invention.
FIG. 6 is an illustration of a motion curve table employed in an embodiment of the present invention.

A description will now be given of a circuit for performing the above-described control, with specific reference to FIG. 5. Numeral 11 designates an operation panel which enables entry of various conditions of operation such as the crank angles at which the press work is to be commenced and finished, as well as predetermined motion curve pattern. These conditions are inputted to a computer (referred to as "CPU" hereafter) 13 through an interface circuit 12, A memory device 14 connected to the CPU 13 has an area 14a for recording principal data or specifications of motors which are employed in the press machine and the feeder, as well as limit specifications or ratings of the respective shafts of the feeder, and an area 14b which stores the conditions entered to the CPU 13 and motion curve tables of the respective shafts of the feeder computed by the CPU 13 on the basis of these entered conditions. The CPU 13 includes a later-mentioned evaluation means which evaluates whether values set in accordance with the motion curve are appropriate. In the event that a set value is determined as being inappropriate, the CPU activates an alarm on the operation panel, whereas, if all the conditions are the safe conditions, it generates a start signal to trigger the operation.

The CPU 13 receives, through an interface circuit 18, values of the crank angle of the press machine as measured by a crank angle sensor 17. Upon receipt of the measured crank angle value, the CPU 13 delivers position command signals to the respective shafts 15a-15i--15n, in accordance with the data on the motion curve table, thereby causing the shafts to perform the motions in accordance with the position commands.

A detailed description will now be given of the feeder control operation performed by this circuit. A motion curve pattern which best meets the conditions of the work and the dies is selected out of a plurality of motion curve patterns as shown in FIG. 3, through the operation panel 11. At the same time, an operation angle corresponding to the press crank angle as shown in FIG. 4 is set by definitely determining the values of the crank angle at which the press work is commenced and finished. These set values are inputted to the CPU 13 through the interface circuit 12. The CPU 13 stores a program for computing, in relation to the crank angle, positions of the feeder shafts necessary for enabling the feeder to correctly trace the motion curve. Therefore, a motion curve table is formed by the computing program, on the basis of the input motion curve pattern and the entered values of the operation angles, and the thus formed motion curve table is stored in the memory device 14b.

The program for forming the motion curve table has been prepared so as to generate curves which ensure smooth movements of the respective shafts of the feeder, e.g., cycloidal curves. An example of the result of the computation is shown in FIG. 6. In FIG. 6, crank angles of the press are plotted along a vertical scale provided on the left end of FIG. 6 and, on the right side of this vertical scale, positions of the respective feeder shafts are shown in terms of stroke values from standard positions determined for the respective shafts. (Note that the crank angle values and the shaft position data are actually stored in the form of digital codes at positions in the memory device 14b designated by addresses.)

As the press work system is started, the crank angle sensor 17 measures the crank angle and the measured value of the crank angle is inputted to the CPU 13 through the interface circuit 18. In the CPU 13, the command positions of the feeder shafts 15a-15i-15n are read out of the motion curve table stored in the memory device 14b, and the read position commands are compared with later-mentioned position information of the respective feeder shafts. Drive signals for the respective feeder shafts are formed on the basis of the result of the comparison and are delivered to the control circuits for controlling the operation of the respective feeder shafts 15a-15i-15n.

The motion of the feeder will now be described with reference to the case of the feed shaft 15a by way of example. A digital-to-analog conversion circuit (referred to as "DAC" hereinunder) 51 is provided in the input portion of the control circuit for controlling the feed shaft 15a. The DAC converts the digital feed shaft drive signal into an analog value and delivers it to the servo amplifier 52. The servo amplifier 52 compares the input drive signal with a signal derived from a later-mentioned tacho-generator 54 and drives the servo motor 53 in accordance with the voltage difference between these signals. The tacho-generator 54 is connected to the servo motor 53 so as to detect the speed of rotation of the servo motor 53 and feed it back to the servo amplifier 52, whereby the servo motor 53 rotates at the commanded speed of rotation in accordance with the drive signal input through the CPU 13. As a consequence, the feed shaft 15a connected to the servo motor 53 moves at the command speed.

A position sensor 55 coupled to the feed shaft 15a detects the instant position of the feed shaft 15a. The value measured by the position sensor 55 is delivered to the CPU 13 through the interface circuit 16. The CPU 13 compares the position information concerning the feed shaft 15a input thereto with the command position of the feed shaft 15a read from the motion curve table, and forms a drive signal of a magnitude corresponding to the difference. The CPU delivers this drive signal to the control circuit for controlling the feed shaft 15a, thereby activating the feed shaft 15a.

Similarly, other feeder shafts 15i-15n operate and move in accordance with commands given by the CPU 13, so that the feeder operates to trace the commanded motion curve.

Figure 7:
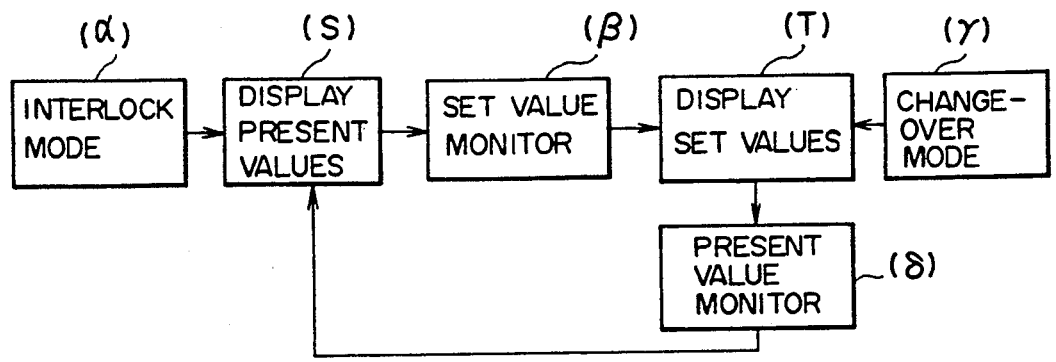
FIG. 7 is an illustration of operation of a monitor incorporated in an embodiment of the present invention.
Figure 9:
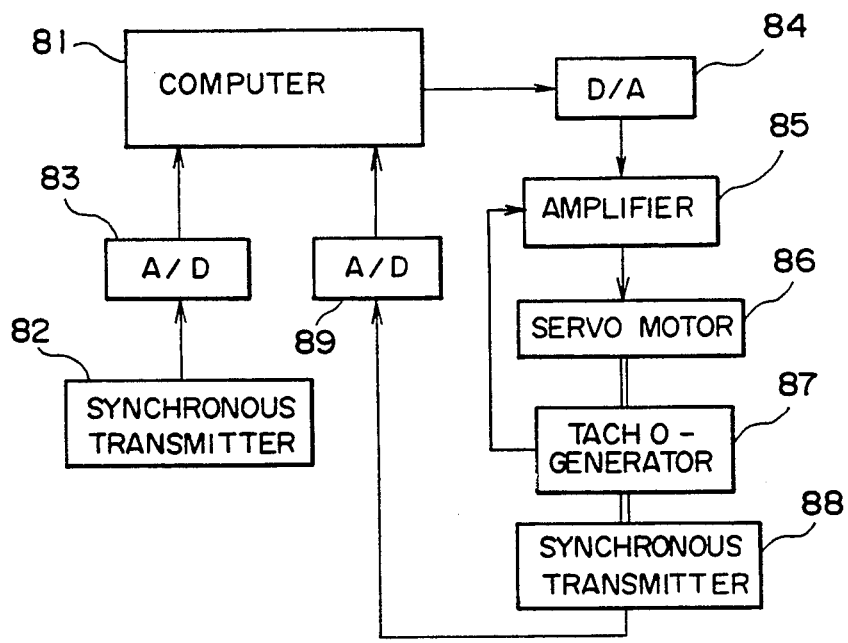
FIG. 9 is a block diagram of a conventional work feeder controller.

FIG. 7 illustrates an example of operation of a monitor for monitoring the commands on the feeder and the operation of the feeder. When a mode select switch on an operation panel (not shown) is turned to select interlock mode ($\alpha$), a liquid crystal monitor display panel displays the feed pattern under operation, the major set data, the crank angle of the press and the positions of the respective feeder shafts in terms of the stroke values from reference points for the respective shafts (S), together with the indication of the present values.

Subsequently, when a select switch on the operation panel (which is not shown) is turned to select set value monitor mode ($\beta$), the liquid crystal display panel displays, together with an indication of the set value in the interlock mode, the names of the feeder shafts, the set stroke values of the respective shafts, and the start angles and the stop angles of the respective shafts (T). Then, as a display change-over switch on the display panel (which is not shown) is turned to select a change-over mode ($\gamma$), the feeder shaft is successively changed on the display. Then, as a select switch on the operation panel (which is not shown) is turned to select present value monitor ($\delta$), the display is reset to the initial state to display the present values (S).

According to the described embodiment, it is possible to automatically set the motion curve for the drive motor of each shaft of the feeder, by setting the feeder operation start angle and stop angle in accordance with the shape and size of the press die. Thus, a safe and appropriate motion of the feeder can be obtained for any given construction and size of the feeder die.

Figure 8:
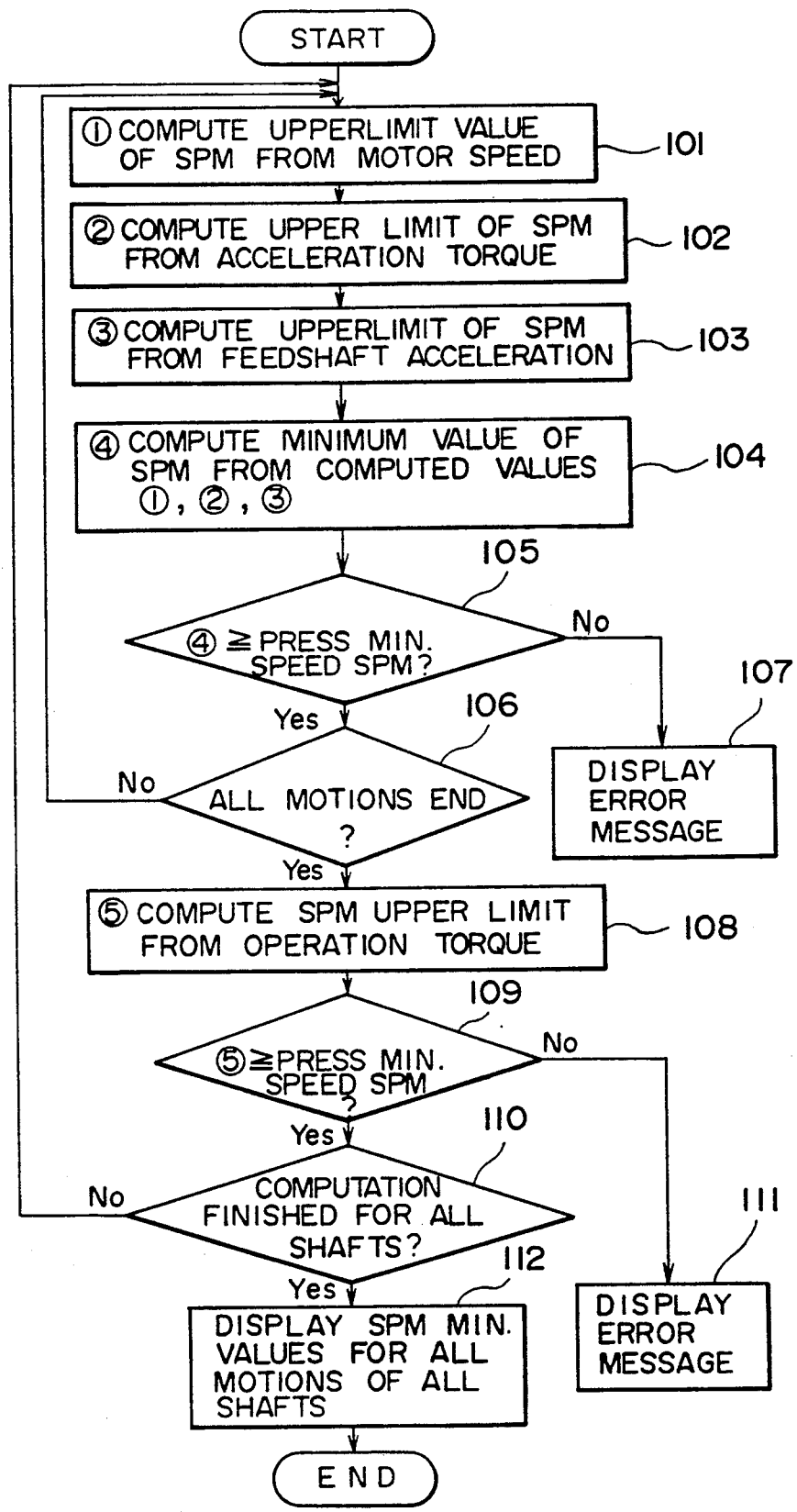
FIG. 8 is a flow chart illustrating operation of another embodiment of the work feeder controller of the present invention.

A detailed description will now be given of another embodiment of the present invention with reference to a flow chart shown in FIG. 8. This flow chart shows the operation of the CPU in the feeder controller, more specifically, operations of means for computing maximum allowable operation strokes and means for comparing this stroke number with a stroke number which has been set, thereby examining whether the set stroke number is appropriate.

In the first step 101, the upper limit value of the stroke number per unit time (minute) (referred to as "SPM", hereinunder) is computed in accordance with the following formula from the specification concerning rotation speed of the feed shaft driving motor, for a specific motion of this feed shaft. The result ① of the computation is stored in a memory device 14b shown in FIG. 5.

$$e, crc/1/ = (K_n \times N_m \times K_1 \times \theta_i)/(360 \times L_i \times V_m)$$

wherein
 $K_n$: Safety factor
 $\theta_i$: Operation angle (deg)
 $N_m$: Rated rotation speed of motor (rpm)
 $K_1$: Amount of travel of feed shaft per one motor rotation (m/rev)
 $L_i$: Amount of travel of feed shaft (m)
 $V_m$: Dimensionless maximum speed In the next step 102, the upper limit value of SPM is computed in accordance with the following formula from the motor specifications concerning the possible acceleration torque, neglecting the load torque imposed by the force of gravity, and the result ② of computation is stored in the memory device 14b.

$$②=(\theta_i/6)\times\{(K_{ps}\times T_{ps}-T_{L1})\times K_2/(J_T\times L_i\times A_m)\}^{\frac{1}{2}}$$

wherein, $K_{ps}$: Safety factor
$\theta_i$: Operation angle (deg)
$T_{ps}$: Instantaneous maximum torque of motor (Kg.m)
$T_{L1}$: Friction load torque (Kg.m)
$K_2$: Amount of travel of feed shaft per one motor rotation (m/rad)
$J_T$: Total inertia (Kg.m.sec$^2$)
$L_i$: Amount of travel of feed shaft (m)
$A_m$: Dimensionless maximum acceleration (—)

Then, in the next step 103, the upper limit value of SPM is computed in accordance with the following equation, on the basis of the feeder shaft specification concerning the feeder shaft acceleration, and the result ③ of computation is stored in the memory device 14b.

$$③=(\theta_i/6)\times\{(\alpha max/(A_m\times L_i)\}^{\frac{1}{2}}$$

wherein $\theta_i$: Operation angle (deg)
$L_i$: Distance of travel of feed shaft (m)
$\alpha max$: Allowable acceleration of feed shaft (Kg.m.sec$^2$)
$A_m$: Dimensionless maximum acceleration (—)

In Step 104, the minimum value of SPM of the motion of this feed shaft is determined from the results ①, ② and ③ of the computations, and the result ④ is stored in the memory device 14b.

Then, in the next step 105, the minimum SPM ④ is compared with the value of SPM which is determined by the speed of the drive motor which operates in synchronization with the press or with the value of SPM set in the memory device when the feeder operates alone.

If the minimum SPM ④ allowed for the feed shaft motion is equal to or greater than the value of SPM determined by the speed of the drive motor which operates in synchronization with the press (or with the value of SPM set in the memory device 14a), the process proceeds to the next step 106, since in this case the moving speed commanded on the basis of the press crank angle is equal to or smaller than the drive speed allowed for the feed shaft. Then, examination is commenced for the next motion of the feed shaft to repeatedly conduct the above-mentioned computations and comparing operations (steps 101 to 106).

Conversely, if the allowable minimum value of SPM ④ is smaller than the value of SPM determined by the speed of the drive motor which operates in synchronization with the press (or with the value of SPM set in the memory device 14a), the process proceeds to a step 107 in which an error message is displayed on the operation panel, since in this case the moving speed commanded from the press crank angle is greater than the drive speed allowed for the feed shaft. The message contains, for example, the name of the feed shaft, the name of the motion and the indication of "overload".

If the evaluation in the step 106 has proved that the set values for all motions of this feed shaft are satisfactory in view of the specifications and conditions, the process proceeds to the next step 108 in which an upper limit value of SPM is computed on the basis of the motor specifications concerning the effective torque, and the result ⑤ of the computation is stored in the memory device 14b.

$$⑤=\left[\left(60\times K_{CN}^2\times T_{CN}^2-T_{L1}^2/6\sum_{i}^{N}\theta_i\right)\times K_i^2/\left(J_r^2\times K_A\times 6^3\times \sum_{j}^{N}(L_i^2/\theta_i^2)\right)\right]^{\frac{1}{4}}$$

wherein, $K_{CN}$: Safety factor
$\theta_i$: operation angle (deg)
$T_{CN}$: Rated torque of motor (Kg.m)
$T_{L1}$: Friction load torque (Kg.m)
$K_i$: Amount of travel of feed shaft per one motor rotation (m/rev)
$J_r$: Total inertia (Kg.m.sec$^2$)
$L_i$: Amount of travel of feed shaft $$K_A: \int_0^{ti} T_i^2\cdot dt/ti$$

$T_i$: Acceleration/deceleration torque during operation (Kg.m)
$t_i$: Operation time (sec)

In Step 109, the computation result ⑤ is compared with the value of SPM which is determined by the speed of the driving motor which operates in synchronization with the press (or with the value of SPM set in the memory device 14a). If the comparison in this step has proved that the value of SPM which is determined by the speed of the driving motor which operates in synchronization with the press (or with the value of SPM set in the memory device 14a) is equal to or greater than computation result ⑤ and if this condition has been confirmed for all feed shafts, the feed shaft can be operated without problem, since in this case the moving speed commanded by the crank angle is equal to or lower than the drive speed allowed for the feeder shafts. In this case, therefore, the process proceeds to a step 110. It will be seen that the above-described flow is repeatedly conducted for the purpose of comparison and evaluation for each of all other feeder shafts, i.e., the clamp shaft, lift shaft and so forth. (steps 101 to 110)

Conversely, if the comparison conducted in Step 109 has proved that, for any one of the fed shafts, the computation result ⑤ is smaller than the SPM determined by the rotation speed of the driving motor which operates in synchronization with the press (or the value of SPM set in the memory device 14a), since in this case the moving speed commanded by the crank angle is greater than the driving speed allowed for the feed shaft, an error message is displayed on the operation panel for a warning purpose, the error message containing, for example, the name of the feed shaft and indication of "overload". (step 111)

If all motions of all feeder shafts are determined as being safe in the step 110, a message is displayed indicating that examination has been finished for all motions of all feeder shafts, accompanied by, for example, display of the values of SPM in each motion of each feeder shaft. (step 112)

The above-described conditions for evaluation are not exclusive. It is possible to store necessary conditions on the basis of the constructions and performance of the press and the feeder such as motion curves of the press corresponding to the conditions of the press work and the motor specifications, conditions of the press work and specifications of the respective feeder shafts and driving motors, and so forth, or to set any desired condition for evaluation.

Thus, the described embodiment eliminates problems such as an accidental stopping of the press or the feeder due to overload.

INDUSTRIAL APPLICABILITY

The present invention can suitably be carried out in the form of a work feeder which automatically conducts feeding of works into and out of a press machine in relation to the operation of such press machine. In particular, the present invention provides a work feeder controller which enables the work feeder to operate with high degrees of reliability and efficiency.

We claim:

1. An automatic press work system comprising a press machine, said press machine having a crank shaft with a crank rotational angle, a work feeder having at least one movable shaft, a driving motor for driving said movable shaft, and a work feeder controller for automatically moving said work feeder three-dimensionally in accordance with the crank rotation angle of said crank shaft for feeding a work into and out of a predetermined position in said press machine, wherein said work feeder controller comprises:

a digital computer having a memory;

an operation panel connected to said computer for inputting to said computer data for setting a motion curve of said movable shaft for a given work wherein said motion curve is representative of the relationship of the position of said movable shaft and the crank rotation angle necessary for the work feeder to execute operations to trace the respective motion curve, data for setting at least one specification value of said driving motor for driving said movable shaft, data for setting an operation start angle value for said movable shaft in terms of the rotational angle of said crank shaft at the time at which said movable shaft starts to execute a particular operation, and data for setting an operation finish angle value for said movable shaft in terms of the rotational angle of said crank shaft at the time at which said movable shaft finishes the execution of said particular operation;

whereby said computer sets and stores in said memory said motion curve associated with the set stroke values of said motion curve, said specification value of said driving motor, said operation start angle value, and said operation finish angle value;

said computer computing the allowable maximum operation stroke number of said movable shaft on the basis of the stored operation start angle value, the stored operation finish angle value, the stored set stroke values, and the stored specification value for said driving motor, and comparing the thus computed allowable maximum operation stroke number for said movable shaft with a set stroke value for the purpose of evaluation of the thus compared set stroke value.

2. An automatic press work system in accordance with claim 1, wherein said press machine has press machine motors; wherein said operation panel is also for inputting to said computer data for setting at least one specification value of said press machine motors and for inputting data for setting at least one load condition corresponding to said work, whereby said computer also stores in said memory said at least one specification value of said press machine motors and said at least one load condition corresponding to said work; and wherein said computer computes said allowable maximum operation stroke number of said movable shaft on the basis of the stored operation start angle value, the stored operation finish angle value, the stored set stroke values, the stored specification of said driving motor, the at least one stored specification of said press machine motors, and the at least one stored load condition corresponding to said work.

3. An automatic press work system in accordance with claim 2, further comprising means, responsive to said comparing by said computer, for providing an alarm if, upon such evaluation, a set stroke number is determined to be inappropriate.

4. An automatic press work system in accordance with claim 3, further comprising means, responsive to said comparing by said computer, for applying a start signal to said press machine if, upon such evaluation, all of the set stroke numbers are determined to be appropriate.

5. An automatic press work system in accordance with claim 1, further comprising means, responsive to said comparing by said computer, for providing an alarm if, upon such evaluation, a set stroke number is determined to be inappropriate.

6. An automatic press work system in accordance with claim 1, further comprising means, responsive to said comparing by said computer, for applying a start signal to said press machine if, upon such evaluation, all of the set stroke numbers are determined to be appropriate.

7. An automatic press work system in accordance with claim 6, further comprising a crank angle sensor for measuring the rotational angle of said crank shaft, for producing a crank angle signal representative thereof, and for inputting said crank angle signal to said computer; whereby said computer utilizes said crank angle signal and the stored motion curve to produce a drive signal; and means for applying said drive signal to said driving motor to control the operation of said movable shaft so that said work feeder traces the motion curve.

8. An automatic press work system in accordance with claim 7, further comprising a position sensor for detecting the instant position of said movable shaft and for inputting a signal representative thereof to said computer.

9. An automatic press work system in accordance with claim 7, wherein said means for applying comprises a digital to analog converter for converting said drive signal to an analog drive signal, a sensor for detecting the speed of rotation of said drive motor and producing a speed signal representative thereof, and a servo amplifier for comparing said analog drive signal and said speed signal and for controlling the speed of said driving motor responsive to the comparison of said analog drive signal and said speed signal.

10. An automatic press work system comprising a press machine, said press machine having a crank shaft with a crank rotational angle, a work feeder having at least two movable shafts, at least two driving motors, each of said driving motors being for driving a respective movable shaft, and a work feeder controller for automatically moving said work feeder three-dimensionally in accordance with the crank rotation angle of said crank shaft for feeding a work into and out of a predetermined position in said press machine, wherein said work feeder controller comprises:

- a digital computer having a memory;
- an operation panel connected to said computer for inputting to said computer data for setting a motion curve for each of the movable shafts for a given work wherein each motion curve is representative of the relationship of the position of the respective movable shaft and the crank rotation angle necessary for the work feeder to execute operations to trace the respective motion curve, data for setting specification values of said driving motors, data for setting an operation start angle value for each of said movable shafts in terms of the rotational angle of said crank shaft at the time at which the respective one of said movable shafts starts to execute a particular operation, and data for setting an operation finish angle value for each of said movable shafts in terms of the rotational angle of said crank shaft at the time at which the respective one of said movable shafts finishes the execution of said particular operation;
- whereby said computer sets and stores in said memory said motion curve associated with the set stroke values of said motion curve, said specification value of said driving motor, each said operation start angle value, and each said operation finish angle value;
- said computer computing the allowable maximum operation stroke number for each of said movable shafts on the basis of the stored operation start angle value for the respective one of said movable shafts, the stored operation finish angle value for the respective one of said movable shafts, the stored set stroke values for the respective one of said movable shafts, and the stored specification value for the driving motor for the respective one of said movable shafts, and comparing the thus computed allowable maximum operation stroke number for each respective one of said movable shafts with a set stroke value for the respective one of said movable shafts for the purpose of evaluation of the thus compared set stroke value for each of said movable shafts.

11. An automatic press work system in accordance with claim 10, wherein said press machine has press machine motors; wherein said operation panel is also for inputting to said computer data for setting specification values of said press machine motors and for inputting data for setting load conditions corresponding to said work, whereby said computer also stores in said memory said specification values of said press machine motors and said load conditions corresponding to said work; and wherein said computer computes the allowable maximum operation stroke number for each respective one of said movable shafts on the basis of the stored operation start angle value for said respective one of said movable shafts, the stored operation finish angle value for said respective one of said movable shafts, the stored set stroke values for said respective one of said movable shafts, the stored specification values for the driving motors, the stored specifications for said press machine motors, and the stored load conditions corresponding to said work.

12. An automatic press work system in accordance with claim 11, wherein said at least two movable shafts comprise at least one feed shaft for moving a work laterally, at least one lift shaft for moving a work vertically, and at least one clamp shaft for clamping and unclamping a work.

13. An automatic press work system in accordance with claim 12, further comprising means, responsive to said comparing by said computer, for providing an alarm if, upon such evaluation, a set stroke number is determined to be inappropriate.

14. An automatic press work system in accordance with claim 13, further comprising means, responsive to said comparing by said computer, for applying a start signal to said press machine if, upon such evaluation, all of the set stroke numbers are determined to be appropriate.

15. An automatic press work system in accordance with claim 10, further comprising means, responsive to said comparing by said computer, for providing an alarm if, upon such evaluation, a set stroke number is determined to be inappropriate.

16. An automatic press work system in accordance with claim 10, further comprising means, responsive to said comparing by said computer, for applying a start signal to said press machine if, upon such evaluation, all of the set stroke numbers are determined to be appropriate.

17. An automatic press work system in accordance with claim 16, further comprising a crank angle sensor for measuring the rotational angle of said crank shaft, for producing a crank angle signal representative thereof, and for inputting said crank angle signal to said computer; whereby said computer utilizes said crank angle signal and the stored motion curve for a respective movable shaft to produce a drive signal for the respective driving motor; and means for applying each drive signal to the respective driving motor to control the operation of said movable shafts.

18. An automatic press work system in accordance with claim 17, further comprising a position sensor for detecting the instant position of said movable shaft and for inputting a signal representative thereof to said computer.

19. An automatic press work system in accordance with claim 18, wherein said means for applying comprises a digital to analog converter for converting each drive signal to an analog drive signal, a sensor for detecting the speed of rotation of the respective drive motor and producing a speed signal representative thereof, and a servo amplifier for comparing the respective analog drive signal and the respective speed signal and for controlling the speed of the respective driving motor responsive to the comparison of the respective analog drive signal and the respective speed signal.

20. A method for automatically controlling the three-dimensional movement of a work feeder in an automatic press work system, wherein the automatic press work system includes, in addition to said work feeder, a press machine having a crank shaft with a crank rotational angle, wherein said work feeder has at least one movable shaft and a driving motor for driving a respective movable shaft; said method comprising:

- storing at least one specification value of the driving motor for driving a respective movable shaft of said work feeder;
- setting and storing, in terms of said crank rotational angle, an operation start angle value representing the timing at which said respective movable shaft of said work feeder starts an operation;

setting and storing, in terms of said crank rotational angle, an operation finish angle value representing the timing at which said respective movable shaft of said work feeder finishes the respective operation;

setting and storing a motion curve of said respective movable shaft for a given work, including the set stroke values of the thus set motion curve;

computing the allowable maximum operation stroke number of said respective movable shaft on the basis of the thus set and stored operation start angle value of said respective movable shaft, the thus set and stored operation finish angle value of said respective movable shaft, the thus set and stroked stroke values of said respective shaft, and the stored at least one specification value of the driving motor for said respective movable shaft; and comparing the allowable maximum operation stroke number for said respective movable shaft with a stet stroke value which has been set for said respective movable shaft, for the purpose of evaluation of the thus compared set stroke value for said respective movable shaft.

21. A method in accordance with claim 20, wherein said press machine has press machine motors; and further comprising:

storing specification values of said press machine motors;

storing load conditions corresponding to said work; and wherein said step of computing comprises computing said allowable maximum operation stroke number of said respective movable shaft on the basis of the stored operation start angle value of said respective movable shaft, the stored operation finish angle value of said respective movable shaft, the stored set stroke values of said respective movable shaft, the stored at least one specification value of the driving motor for said respective movable shaft, the stored specification values of said press machine motors, and the stored load conditions corresponding to said work.

22. A method in accordance with claim 21, further comprising activating an alarm if, upon such evaluation, a set stroke number is determined to be inappropriate.

23. A method in accordance with claim 22, further comprising applying a start signal to said press machine if, upon such evaluation, all of the set stroke numbers are determined to be appropriate.

24. A method in accordance with claim 20, further comprising activating an alarm if, upon such evaluation, a set stroke number is determined to be inappropriate.

25. A method in accordance with claim 20, further comprising applying a start signal to said press machine if, upon such evaluation, all of the set stroke numbers are determined to be appropriate.

26. A method in accordance with claim 20 wherein said work feeder has at least three movable shafts and driving motors for driving each of said movable shafts; said at least three movable shafts including at least one feed shaft for moving a work laterally, at least one lift shaft for moving a work vertically, and at least one clamp shaft for clamping and unclamping a work;

wherein said step of computing comprises computing the allowable maximum operation stroke number of each of said movable shafts on the basis of the stored operation start angle value of the respective one of said movable shafts, the stored operation finish angle value of the respective one of said movable shafts, the stored set stroke values of the respective one of said movable shafts, and the stored specification value for the driving motor for the respective one of said movable shafts; and wherein said step of comparing comprises comparing the thus computed allowable maximum operation stroke number for each respective one of said movable shafts with a set stroke value for the respective one of said movable shafts for the purpose of evaluation of the thus compared set stroke value for each respective one of said movable shafts.

27. A method in accordance with claim 26, further comprising activating an alarm if, upon such evaluation, a set stroke number is determined to be inappropriate.

28. A method in accordance with claim 26, further comprising applying a start signal to said press machine if, upon such evaluation, all of the set stroke numbers are determined to be appropriate.

29. A method in accordance with claim 28, further comprising measuring the rotational angle of said crank shaft and producing a crank angle signal representative thereof;

utilizing said crank angle signal and the stored motion curve for a respective movable shaft to produce a drive signal for each driving motor; and applying each drive signal to the respective driving motor to control the operation of said movable shafts.

30. A method in accordance with claim 29, wherein said step of applying comprises converting each drive signal to an analog drive signal, detecting the speed of rotation to the respective drive motor and producing a speed signal representative thereof, comparing the respective analog drive signal and the respective drive signal, and controlling the speed of the respective driving motor responsive to the comparison of the respective analog drive signal and the respective speed signal.

* * * * *

UNITED STATES PATENT AND TRADEMARK OFFICE
CERTIFICATE OF CORRECTION

PATENT NO. : 5,231,860
DATED : August 3, 1993
INVENTOR(S) : Katsuji TSURUTA

It is certified that error appears in the above-identified patent and that said Letters Patent is hereby corrected as shown below:

Column 13, line 27, change "curve" to --curves--.

Column 13, line 28, change "curve" to --curves--.

Column 13, line 29, change "value" to --values--.

Column 13, line 29, change "said driving motor," to --the driving motors,--.

Column 14, line 42, change "said" to --each--.

Column 15, line 16, change "stroked" to --stored--.

Column 15, line 17, change "respective shaft" to --respective movable shaft--.

Column 15, line 22, change "stet" to --set--.

Column 16, line 49, change "to" to --of--.

UNITED STATES PATENT AND TRADEMARK OFFICE
CERTIFICATE OF CORRECTION

PATENT NO. : 5,231,860
DATED : August 3, 1993
INVENTOR(S) : Katsuji Tsuruta

It is certified that error appears in the above-indentified patent and that said Letters Patent is hereby corrected as shown below:

Column 16, line 51, change "respective drive" to --respective speed--.

Signed and Sealed this

Seventh Day of June, 1994

Attest:

BRUCE LEHMAN

Attesting Officer     Commissioner of Patents and Trademarks